INVENTOR.
RALPH R. SWAIN
BY Raymond W. Junkins
ATTORNEY

Patented Feb. 6, 1951

2,540,966

UNITED STATES PATENT OFFICE 2,540,966

FURNACE CONTROL SYSTEM

Ralph R. Swain, South Euclid, Ohio, assignor to Bailey Meter Company, a corporation of Delaware Application December 11, 1946, Serial No. 715,374

9 Claims. (Cl. 236—15)

My invention relates to control systems for furnaces, and more particularly to systems for controlling the operation of a furnace in a manner to effect a heating of articles to a desired temperature.

It is sometimes necessary in the processing of articles that they be heated to some predetermined temperature. Such heating may desirably be effected by passing the articles through one or more furnaces to which fuel is supplied under the control of a system operating in response to the temperature of the articles. A preferred form of the control system may include a balanceable circuit which is made responsive to the temperature of the articles and operates to control apparatus which regulates the flow of fuel to the furnace. When the circuit is balanced and the temperature of the articles is at the desired value, the apparatus may operate to supply fuel to the furnace at a predetermined rate. Any unbalance of the circuit by a variation of the temperature of the articles from the desired value results in an increase or a decrease in the flow of fuel until the temperature of the articles returns to the desired value. In order that the circuit may regulate the supply of fuel only in accordance with the temperature of the articles, there may be provided means for rendering the circuit ineffective when there is no article within its range. The supply of fuel to the furnace at this time is desirably reduced to a minimum value.

An object of my invention is to provide an improved control system for a furnace. Another object is to provide an improved control system operating in accordance with the temperature of an article heated by a furnace for controlling the supply of fuel to the furnace. Yet another object is to provide a control system for controlling the supply of fuel to a furnace in a manner to heat an article to a desired value. Still another object is to provide a system for controlling the supply of fuel to a furnace in accordance with the temperature of an article heated thereby, and operating to reduce the supply of fuel to a minimum value when no article is being heated. These and other objects will appear in the course of the following description.

In the accompanying drawing there is shown a preferred form which my invention may assume in practice.

Figures 1, 2:
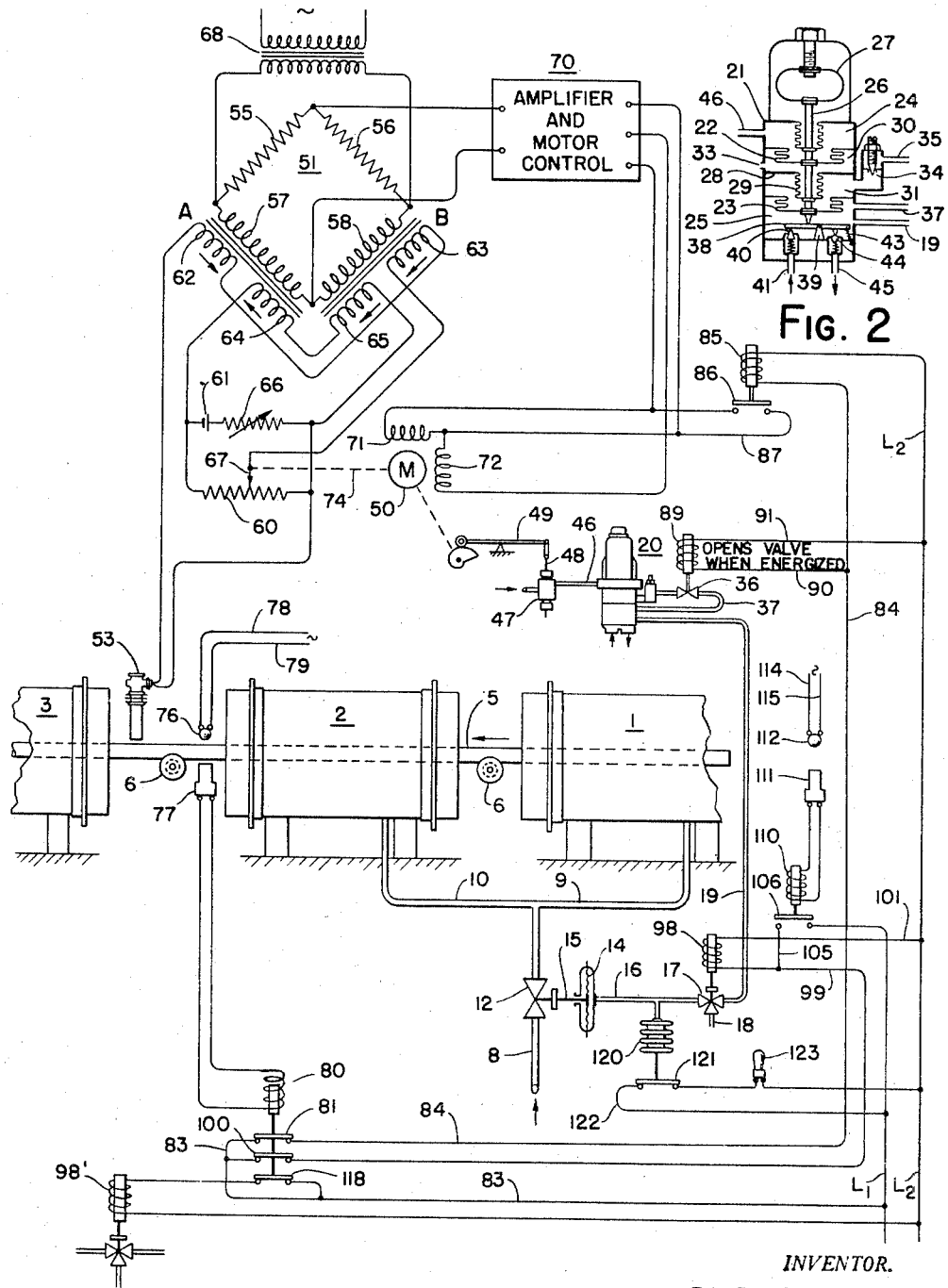
Fig. 1 is a schematic diagram of my improved control system.
Fig. 2 is an enlarged vertical sectional view of a relay used in the control system.

In the illustrative embodiment of my invention there is shown a number of furnaces, generally designated 1, 2 and 3, through which an elongated article 5, such as a rod or section of tubing, is being fed in the direction of the arrow. The article is shown herein as being supported by rollers 6, and suitable means, not shown, may be provided for rotating the rollers to effect a feeding of the article at any desired speed. Fuel is supplied from a source of supply through a conduit 8 to branch conduits 9 and 10 opening into the furnaces 1 and 2, and a valve 12 in the conduit 8 is adapted to be operated by my improved control system for regulating the flow of fuel. A pressure responsive device, such as a diaphragm 14, is connected to the stem 15 of the valve 12 and operates on the supply of pressure fluid thereto to move the valve toward its open position. A conduit 16 communicates with the diaphragm 14 and is adapted to be connected by a valve 17 in communication with either a vent 18 or a conduit 19 leading to a standardizing relay 20 of the type disclosed in the Gorrie Patent Re. 21,804.

The relay 20 comprises, as shown in Fig. 2, a casing 21 having flexible members 22 and 23 arranged therein to form upper and lower pressure chambers 24 and 25, respectively. A rod 26 connected to the mid-portion of each of the flexible members, and a spring 27 is adjustably connected between the upper end of the casing and the rod. Extending inwardly from the casing between the flexible members is a wall portion 28, and a bellows 29 is connected between the inner edge of the wall portion and the rod 26 to form chamber spaces 30 and 31 at its opposite sides. The space 30 is connected in communication with the atmosphere through a port 33 in the casing, and the space 31 communicates through a restricted opening 34 with a conduit 35 which is connected by a valve 36 in communication with a conduit 37 opening into the lower pressure chamber 25. A lever 38 is acted upon by the lower end of the rod 26 and is adapted to be swung by the latter about a pivot 39 to unseat a valve 40 controlling the flow of pressure fluid from a supply line 41 to the chamber 25. A spring 43 tends to swing the lever in a direction to unseat a valve 44 for connecting the chamber 25 to an exhaust line 45.

If the spring 27 is adjusted to balance the forces on the rod 26 when the pressure in chamber 24 is at a predetermined value and the pressures in chambers 25 and 31 are equal, then the lever 38 will be in a position to permit valves 40 and 44 to close. Any increase in pressure in the chamber 24 will cause the rod 26 to swing the lever 38 and unseat the valve 40 so as to admit pressure fluid to the chamber 25 and increase the pressure therein until it balances the greater pressure in chamber 24. If the valve 36 is open, the pressure fluid will pass slowly from the chamber 25 through the conduits 37, 35 and the restricted port 34 to the chamber 31 where it will act downwardly on the member 23 and tend to balance the pressure chamber 25. As the pressure in chambers 25 and 31 approach a balance, the mechanism becomes unbalanced again if the increased pressure continues to exist in chamber 24, and the lever 38 is moved again to unseat the valve 40. A pressure drop in chamber 24 below the predetermined value results in an unbalance to unseat the valve 44 and vent fluid from the chamber 25. The fluid then passes slowly from the chamber 31 to the chamber 25 and necessitates further venting to balance the reduced pressure in chamber 24. Since the relay is fully described in the patent referred to above, it is believed that further description of the same herein is unnecessary.

The conduit 19 opens into the pressure chamber 25, and a conduit 46 supplies pressure fluid to the pressure chamber 24 under the control of a pilot valve 47 of the type disclosed in the Johnson Patent 2,054,464. A valve element 48 of the pilot valve is adjustably connected to a lever 49 which is operatively connected to a motor 50. The motor 50 is connected to rotate in one direction or another depending upon the direction of unbalance of a balanceable circuit 51 which is sensitive to an element 53, such as a thermocouple, responsive to the temperature of the heated article 5.

The balanceable circuit 51 is shown herein as a Wheatstone bridge having fixed resistances 55 and 56 forming one pair of adjacent legs, and impedance windings 57 and 58 of reactor converters A and B forming the other pair of legs. The thermocouple 53 is connected in a standard potentiometer circuit including a balancing potentiometer resistance 60 and a battery 61, and the thermocouple-potentiometer circuit is connected as shown to input windings 62 and 63 of the reactor converters A and B. Bias windings 64 and 65 of the reactor converters are connected in series across the battery 61 and an adjustable resistance 66 of the potentiometer circuit. The inter-action of the windings 62, 64 of converter A and the windings 63, 65 of converter B control the reactance of the windings 57 and 58 of the bridge circuit. The voltage of the thermocouple 53 opposes the potentiometer voltage which may be varied by positioning a contact member 67 for the resistance 60, and any unbalanced portion of these voltages applied to the windings 62, 63 causes an unbalance of the bridge circuit.

A transformer 68 has its primary winding connected to a source of alternating current and its secondary winding connected to diagonally opposite points of the bridge. The remaining diagonally opposite points of the bridge are connected to an amplifier and motor control 70 which is connected in turn to windings 71 and 72 of the motor 50. The bridge circuit 51 and the amplifier and motor control circuit 70 may be like those described in the application to A. J. Hornfeck, Serial No. 544,586, filed July 12, 1944, now Patent No. 2,447,338, dated August 17, 1948, and further description of the same is believed to be unnecessary. Suffice it to say that a low level direct current of given polarity supplied from the thermocouple-potentiometer circuit to the input windings 62, 63 of the reactor converters results in the supply of a greatly amplified alternating current signal of given phase from the bridge to the amplifier and motor control circuit, and the motor windings 71 and 72 are energized from the circuit 70 in a manner to effect rotation of the motor in a given direction. The motor 50 is operatively connected by suitable means 74 to the contact member 67 and positions the latter to balance the potentiometer voltage with the thermocouple voltage so as to effect a balance of the bridge and a stopping of the motor. If the current supplied from the thermocouple-potentiometer circuit to the windings 62, 63 is reversed in polarity, the bridge becomes unbalanced so as to supply a current of reversed phase to the amplifier and motor control and effect an operation of the motor in the reversed direction. Any rotation of the motor causes a positioning of the valve element 48 of the pilot valve to vary the pressure in the chamber 24 of the relay 20.

In order that the pressures acting on the diaphragm 14 to position the valve 12 may vary only in accordance with the temperature of the article being heated, there is provided means for rendering the bridge ineffective to operate the motor when there is no article within the range of the thermocouple. This means comprises a light 76 and a light sensitive cell 77 located adjacent the thermocouple 53 and arranged so that the light rays may be intercepted by the article 5 as it passes from the furnace. The light is connected by conductors 78, 79 to a source of alternating current, and the cell 77 is connected to a solenoid 80 which is adapted when energized, to open a switch 81. A conductor 83 leads from one contact of the switch 81 to one conductor $L_1$ of a power line, and a conductor 84 leads from the other switch contact through a solenoid winding 85 to the other conductor $L_2$ of the power line. The solenoid winding 85 controls a switch 86 in a circuit 87 short circuiting the winding 71 of the motor 50.

When the article 5 intercepts the rays of the light 76, the cell 77 is deenergized and the switch 81 closes so that current passes from the power line $L_1$ through the conductor 83, the switch 81, the conductor 84 and the winding 85 to the power line $L_2$. The switch 86 is then held open and the motor 50 operates in response to any unbalance of the bridge 51 caused by variations of the thermocouple voltage due to changes in temperature of the article. As soon as the article passes from between the light 76 and the cell 77, the solenoid 80 is energized to open the switch 81 and effect a closing of switch 86 for short circuiting the motor winding 71. The motor 50 is then inoperative and remains plugged in the position to which it was last moved by the bridge while the thermocouple was affected by the temperature of the article.

In order that the relay 20 may reach a balanced condition during the period when the motor is plugged, the valve 36 is controlled by a solenoid 89 which is connected by a conductor 90 to the conductor 84, and by a conductor 91 to the power line $L_2$. It will be seen that an opening of the switch 81 breaks the circuit of the power line $L_1$, the conductor 83, the switch 81, the conductors 84, 90, the solenoid 89 and the conductor 91 to the power line $L_2$. The deenergizing of the solenoid 89 results in a closing of the valve 36. The pressure in the chamber 31 of the relay will then be held at the value existing at the time the motor is plugged, and the pressure in chamber 25 will vary until the relay is balanced.

If an article is being heated by the furnaces or is entering the furnaces to be heated, then it is desirable that the valve 17 be in a position to connect the diaphragm 14 to the conduit 19 so that it is subjected to pressure for holding the valve 12 open and supplying fuel to the furnaces, otherwise the valve 17 should be in a position to vent the diaphragm. A solenoid 98 is connected by a conductor 99, a switch 100 adapted to be opened by the solenoid 80, and the conductor 83 to the power line L1, and is connected by a conductor 101 to the power line L2. The solenoid 98 is also adapted to be connected to the power line L1 through a conductor 105 and a switch 106. This solenoid operates when energized to position the valve 17 for connecting the conduit 16 to the conduit 19, and a deenergizing of the solenoid results in an operation of the valve 17 to connect the conduit 16 to the vent 18. The switch 106 is controlled by a solenoid 110 connected to a light sensitive cell 111 which is arranged to receive light rays from a light 112 energized through conductors 114 and 115 leading to a source of alternating current. The light 112 and the cell 111 are arranged so that the rays of light between them may be intercepted by the article as it moves into furnace 1.

The operation of the control system is as follows: Assuming that a pipe section is passing through the furnaces as shown in Fig. 1, the light rays to the cell 77 will be intercepted and the solenoid 80 will be deenergized to effect a closure of switches 81 and 100. With the switch 81 closed, the solenoid 85 will be energized to hold the switch 86 open so that the motor 50 may operate on an unbalance of the bridge 51, and the solenoid 89 will be energized and effect an opening of the valve 36. The relay 20 will then operate in its normal manner to control the pressure in the conduit 19. With the switch 100 closed, the solenoid 98 will be energized for operating the valve 17 to connect the diaphragm 14 to the conduit 19.

If the temperature of the article is at the desired value, then the bridge 51 will be balanced and the valve element 48 of the pilot valve will be in a position to maintain a balancing pressure in the chamber 24 of the relay 20. The pressure in the chamber 25 will be held at a constant value and will be conducted through the conduit 19 to the diaphragm for holding the valve 12 in a partially opened position. A change in the temperature of the article will cause the bridge to become unbalanced and operate the motor to change the position of the valve element so as to subject the relay to an unbalanced pressure. The motor also positions the contact member 67 to rebalance the bridge, but the unbalanced pressure on the relay continues to exist, and the latter operates in one direction or another, depending upon the direction of unbalance, to increase or decrease the pressure in conduit 19 for opening or closing the valve 12 until the temperature of the article is returned to the desired value.

As soon as the article passes out of the path of light rays between the light 76 and the cell 77, the solenoid 80 is energized to open the switches 81 and 100. The solenoids 85 and 89 will be immediately deenergized and will remain so until another article moves between the light 76 and the cell 77. If no article has yet moved between the light 112 and the cell 111, the solenoid 98 will also be deenergized. Deenergizing of the solenoids 85, 89 and 98 results in a plugging of the motor 50, a closing of the valve 36, and an operation of the valve 17 to vent the diaphragm 14 so that the valve 12 moves to a position to reduce the flow of fuel to a minimum value. If an article passes between the light 112 and the cell 111, the switch 106 closes and effects an energizing of the solenoid 98 for positioning the valve 17 to subject the diaphragm 14 to the pressure in the chamber 25 of the relay. This pressure will be the same as that existing at the time the motor is plugged and will cause the valve 12 to open and supply fuel at the same rate as existed at such time. No change in the rate of fuel supply will take place until the article passes between the light 76 and the cell 77 for unplugging the motor and effecting an opening of the valve 36.

It will be understood that a control system like that described above will be provided for furnace 3 and any other furnace or combination of furnaces following it for heating the articles. The system could as well be applied for the control of fuel supply to a single furnace or to any number of furnaces. When another control system is provided for the furnaces beyond the point at which the light 76 and the cell 77 are located, then a switch 118 may be actuated by the solenoid 80 under the control of the cell 77 for controlling the energizing of a solenoid 98' arranged in the other control system and corresponding to the solenoid 98 of the system described.

In order that it may be known when the valve 12 is open and supplying fuel to the furnaces, a pressure responsive element 120 such as a bellows, is subjected to the same pressure that acts on the diaphragm 14 and operates to control a switch 121 in a circuit 122 containing a light 123. When the pressure acting on the diaphragm 14 is sufficient to open the valve 12, the bellows 120 operates to close the switch 121 and complete the light circuit.

While there is described in this application one form which my invention may assume in practice, it will be understood that this form of the same is merely illustrative and that my invention may be modified and embodied in various other forms without departing from its spirit or the scope of the appended claims.

What I claim as new and desire to secure by Letters Patent of the United States is:

1. A control system for a furnace through which an article is moved to be heated comprising, in combination, means for supplying fuel to the furnace, pressure responsive valve means for controlling the flow of fuel through said fuel supply means, means for supplying a pressure fluid to said pressure responsive means, means including an element arranged beyond the discharge end of said furnace and responsive to the temperature of the article as the latter moves past it for controlling the flow of pressure fluid through said fluid supply means, and means responsive only to the presence of the article for controlling the operativeness of said flow controlling means, said last mentioned means including a light sensitive cell and a light source arranged at the discharge end of the furnace so that the path between them may be intercepted by said article and operating only when the light path is intercepted to render the flow controlling means operative to control the flow of fluid in response to temperature changes.

2. A control system for a furnace through which an article is moved to be heated comprising, in combination, means for supplying fuel to the furnace, pressure responsive valve means for controlling the flow of fuel through said fuel supply means, fluid supply and exhaust connections for said pressure responsive means, valve means for connecting said pressure responsive means selectively to said supply and exhaust connections, said valve means normally connecting said pressure responsive means to said exhaust connection, means including a temperature responsive element arranged at one end of the furnace to be subjected to the heat of the article as it passes by, said last mentioned means normally operating in response to the temperature subjected on said element for controlling the flow of pressure fluid through said supply connection, means responsive to the presence of said article for rendering said last mentioned means inoperative to control the flow of pressure fluid in response to temperature changes except when the article is passing said element, and means responsive to the presence of said article for positioning said second mentioned valve means to connect said pressure responsive means to said supply connection while the article is passing through the furnace.

3. A control system for a furnace through which an article is moved to be heated comprising, in combination, means for supplying fuel to the furnace, pressure responsive valve means for controlling the flow of fuel through said fuel supply means, fluid supply and exhaust connections for said pressure responsive means, valve means for connecting said pressure responsive means selectively to said supply and exhaust connections, said valve means normally connecting said pressure responsive means to said exhaust connection, means including a temperature responsive element arranged at one end of the furnace to be subjected to the heat of the article as it passes by, said last mentioned means normally operating in response to the temperature subjected on said element for controlling the flow of pressure fluid through said supply connection, means arranged adjacent said element and sensitive to the presence of the article, and means connected to said last mentioned means and controlling said second mentioned valve means and the operativeness of said means controlling the flow of pressure fluid in response to changes in temperature, said connected means operating when the article is in the presence of said sensitive means to open said second mentioned valve means and to render said flow controlling means operative.

4. A control system for a furnace through which an article is moved to be heated comprising, in combination, means for supplying fuel to the furnace, pressure responsive valve means for controlling the flow of fuel through said fuel supply means, fluid supply and exhaust connections for said pressure responsive means, valve means for connecting said pressure responsive means selectively to said supply and exhaust connections, said valve means normally connecting said pressure responsive means to said exhaust connection, means including a temperature responsive element arranged at one end of the furnace to be subjected to the heat of the article as it passes by, said last mentioned means normally operating in response to the temperature subjected on said element for controlling the flow of pressure fluid through said supply connection, means arranged at each end of the furnace and each sensitive to the presence of the article, means responsive to one of said sensitive means for controlling the operativeness of said means controlling the flow of pressure fluid, and means responsive to each of said sensitive means for controlling said second mentioned valve means said means controlling the flow of pressure fluid being made inoperative to control flow in response to temperature changes until the article comes into the presence of said one of said sensitive means, and said means controlling said valve means operating to open the latter to supply fluid only when the article comes into the presence of one or the other of said sensitive means.

5. A control system for a furnace through which an article is moved to be heated comprising, in combination, means for supplying fuel to the furnace, pressure responsive valve means for controlling the flow of fuel through said fuel supply means, fluid supply and exhaust connections for said pressure responsive means, valve means for connecting said pressure responsive means selectively to said supply and exhaust connections, said valve means normally connecting said pressure responsive means to said exhaust connection, means including a temperature responsive element arranged at one end of the furnace to be subjected to the heat of the article as it passes by, said last mentioned means normally operating in response to the temperature subjected on said element for controlling the flow of pressure fluid through said supply connection, a light sensitive cell and a light source arranged at each end of the furnace so that the paths between them may be intercepted by the article, means including one of said cells for preventing said flow controlling means from operating in response to temperature changes until the light path to the cell is intercepted, and means including each of said cells for controlling said second mentioned valve means.

6. The system of claim 5 wherein the means including the one of said cells at the end of the furnace where said element is located controls the operativeness of said means controlling the flow of pressure fluid, said last mentioned means operating when its cell is deenergized to render the flow controlling means operative, and the means including each of the cells operates when either cell is deenergized to position the valve means for connecting said pressure responsive means to said supply connection.

7. A control system for a furnace through which an article is moved to be heated comprising, in combination, means for supplying fuel to the furnace, pressure responsive valve means for controlling the flow of fuel through said fuel supply means, fluid supply and exhaust connections for said pressure responsive means, valve means for connecting said pressure responsive means selectively to said supply and exhaust connections, said valve means normally connecting said pressure responsive means to said exhaust connection, a balancing relay responsive to pressure supplied thereto for controlling the supply of pressure fluid through said fluid supply connection and operating when balanced to maintain a constant pressure in said connection, means including a motor for subjecting said relay to different unbalancing pressures, a balanceable circuit operable on unbalance to effect an operation of said motor, said circuit including a temperature responsive element affecting its balance and arranged at one end of the furnace to be subjected to the temperature of the article as it passes by, means actuated by said motor for rebalancing said circuit, means arranged at each end of the furnace and each sensitive to the presence of the article, means responsive to one of said sensitive means for controlling the operativeness of said motor in response to unbalances of said circuit, and means responsive to each of said sensitive means for controlling said second mentioned valve means.

8. A control system for a furnace through which an article is moved to be heated comprising, in combination, means for supplying fuel to the furnace, pressure responsive valve means for controlling the flow of fuel through said fuel supply means, fluid supply and exhaust connections for said pressure responsive means, valve means for connecting said pressure responsive means selectively to said supply and exhaust connections, said valve means normally connecting said pressure responsive means to said exhaust connection, a balancing relay responsive to pressure supplied thereto for controlling the supply of pressure fluid to said fluid supply connection and operating when balanced to maintain a constant pressure in said connection, means including a motor for subjecting said relay to different unbalancing pressures, a balanceable circuit operable on unbalance to effect an operation of said motor, said circuit including a temperature responsive element affecting its balance and arranged at one end of the furnace to be subjected to the temperature of the article as it passes by, means actuated by said motor for rebalancing said circuit, and said means including said motor operating to maintain a balancing pressure on said relay when said element is subjected to a predetermined temperature and said balanceable circuit is balanced, a light sensitive cell and a light source arranged at each end of the furnace so that the paths between them may be intercepted by said article, means including one of said cells for controlling the responsiveness of said motor to said balanceable circuit, and means including each of said cells for controlling said second mentioned valve means.

9. The system of claim 8 wherein means including the cell at the end of the furnace where said element is located operates to control the responsiveness of said motor to said balanceable circuit, said means rendering said motor non-responsive when its cell is energized, and the means including each of said cells operates to position said second mentioned valve means for connecting said pressure responsive means to said supply connection when either one of said cell is deenergized.

RALPH R. SWAIN.

REFERENCES CITED

The following references are of record in the file of this patent:

UNITED STATES PATENTS

| Number | Name | Date |
| --- | --- | --- |
| 1,962,676 | Albright | June 12, 1934 |
| 1,978,701 | Dreffein | Oct. 30, 1934 |
| 1,989,829 | Specht | Feb. 5, 1935 |
| 2,025,542 | Lugar | Dec. 24, 1935 |
| 2,037,082 | Martin | Apr. 14, 1936 |
| 2,205,182 | Whitten | June 18, 1940 |
| 2,273,126 | McGillin | Feb. 17, 1942 |
| 2,303,110 | Cockrell | Nov. 24, 1942 |
| 2,324,525 | Mittelmann | July 20, 1943 |
| 2,337,410 | Peters | Dec. 21, 1943 |